(12) United States Patent
Jones et al.

(10) Patent No.: US 7,505,623 B2
(45) Date of Patent: Mar. 17, 2009

(54) IMAGE PROCESSING

(75) Inventors: Graham R. Jones, Oxfordshire (GB); Miles Hansard, London (GB)

(73) Assignee: Sharp Kabushiki Kaisha, Osaka (JP)

( * ) Notice: Subject to any disclaimer, the term of this patent is extended or adjusted under 35 U.S.C. 154(b) by 725 days.

(21) Appl. No.: 11/209,464

(22) Filed: Aug. 23, 2005

(65) Prior Publication Data
US 2006/0045329 A1 Mar. 2, 2006

(30) Foreign Application Priority Data
Aug. 26, 2004 (GB) ................. 0418965.0

(51) Int. Cl.
*G06K 9/00* (2006.01)
(52) U.S. Cl. .................... 382/162
(58) Field of Classification Search ........... 382/154, 382/162, 254, 275; 356/12; 359/462; 348/159
See application file for complete search history.

(56) References Cited

U.S. PATENT DOCUMENTS 5,917,937 A * 6/1999 Szeliski et al. ............ 382/154
6,714,672 B1 * 3/2004 Berestov et al. ............ 382/154
7,257,272 B2 * 8/2007 Blake et al. ................ 382/275
7,292,735 B2 * 11/2007 Blake et al. ................ 382/275

* cited by examiner

*Primary Examiner*—Jose L Couso
(74) *Attorney, Agent, or Firm*—Renner, Otto, Boisselle & Sklar, LLP

(57) ABSTRACT

There is provided a method and apparatus for processing images to create a novel view of a scene. The method comprises the steps of:
(a) providing first and second images of a scene;
(b) applying a stereo matching algorithm to the first and second images to generate a first disparity map which maps between corresponding points from the first image to the second image;
(c) forward mapping the first disparity map into the coordinates of a third image to generate a second disparity map;
(d) using the second disparity map, reverse mapping for at least some of the pixel positions in the third image to corresponding points in the first and second images to obtain possible color values for each of the at least some of the pixels in the third image; and
(e) assigning a final color value to each of the at least some of the pixels in the third image on the basis of the possible color values, thereby providing a novel view of the scene.

22 Claims, 6 Drawing Sheets

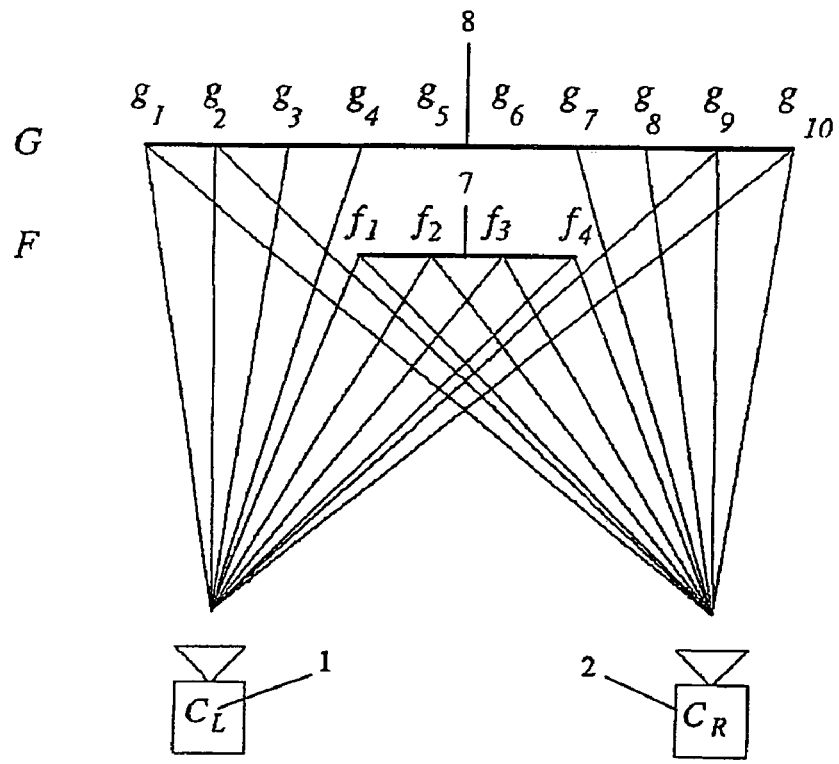
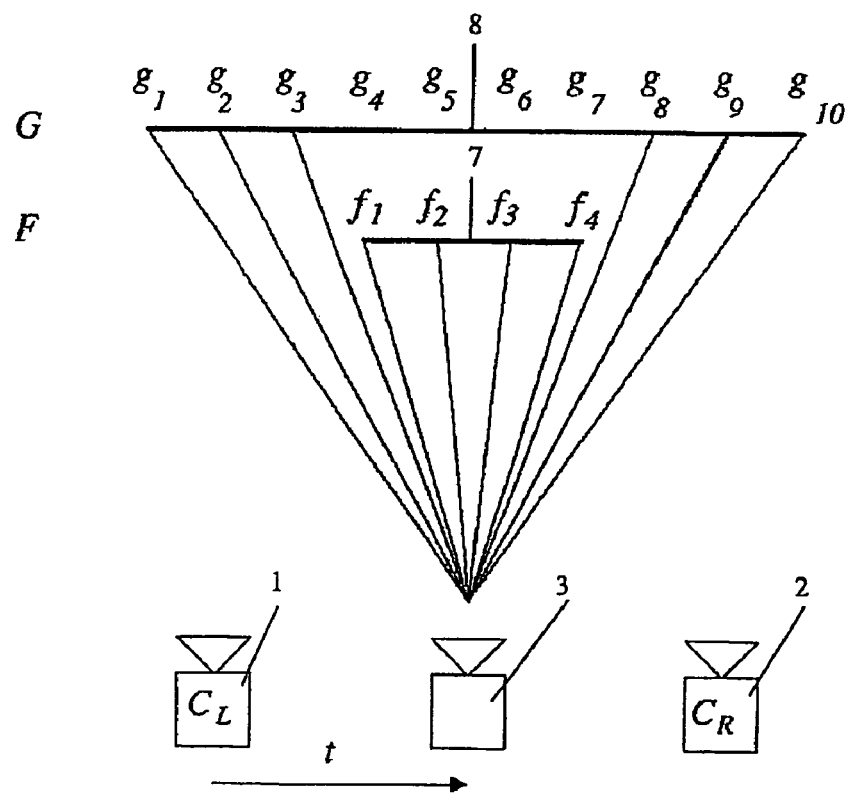

IMAGE PROCESSING

The present invention relates to a method of processing images and in particular to processing first and second images of a scene to provide a third image of that scene from a different viewpoint.

BACKGROUND

In the field of computer imaging, it is often desirable to be able to produce a view of a scene from a viewpoint other than those already available. An application of such a technique is in content generation for stereoscopic displays. In a stereoscopic display, two slightly different images of the same scene are supplied to a user, one image being supplied to each eye, the perception of the user being that of a three-dimensional scene. It may be the case that the depth range provided by the two images is too great for comfortable viewing on a given three-dimensional display, in which case it is desirable to vary the depth range in the stereogram. No explicit three-dimensional information about the scene may be available, and a method of providing a new image of the scene on the basis of existing images only would allow the creation of a new stereogram which would be more comfortable for the user to view.

Several existing view synthesis techniques are known. Chen and Williams, View Interpolation for Image Synthesis, Proc, ACM SIGGRAPH 1993, pages 279-288 and Chen and Williams, Three-Dimensional Image Synthesis using View Interpolation, U.S. Pat. No. 5,613,048 describe how a three-dimensional scene can be represented by a collection of two dimensional images. It is assumed that a number of "correspondence maps" are available. These maps define the position in each two-dimensional image of a given feature as the viewpoint changes. It is suggested that the maps could be obtained by manually labelling features in the source images or by reference to a geometric model of the scene. The changes in position of a given feature define the binocular disparities of the points in the scene.

To produce a novel view of the scene, pixels from the source images are "forward mapped" into a new image in accordance with the correspondence maps. If multiple features are mapped to the same target position in the novel view, the feature that is "in front" is chosen. This technique can reduce the amount of storage space and rendering time required without necessarily compromising the quality of the novel view. There is, however, no guarantee that the novel view will be complete: there may be regions in the novel view which were not populated with colour values in the forward mapping process. It is suggested that the novel view should initially be filled with a distinctive colour which is subsequently overwritten by the forward-mapped pixel values. Any gaps in the novel view can therefore be easily identified. The gaps are then filled by interpolation from the surrounding pixel colours or interpolation of the surrounding correspondence map information with reference back to the source images. Neither of these techniques produces an accurate representation. Interpolation of the surrounding pixel colours can only produce a smooth transition between the nearby pixels, resulting in a poor approximation to any image structure that ought to appear in the missing region. The novel view will therefore appear blurred, and this problem will increase with the size of the region from which information is missing. Simple interpolation of the correspondence map data in the neighbourhood of the gap is not usually appropriate, as it does not account for depth-discontinuities.

A theoretical analysis of view interpolation is given in Seitz and Dyer, View Morphing, Proc, ACM SIGGRAPH 1996, pages 21-30, which improves upon the method of Chen and Williams as applied to real images. Again, correspondence maps are obtained defining the image position of a given feature. A stereo matching algorithm can be applied to pairs of images to generate the correspondence map. To render a novel view, Seitz and Dyer use the same forward mapping procedure as Chen and Williams. Colour information from both source images is blended to produce pixel values in the novel view. Gaps in the novel view are filled by interpolating between the nearby pixels.

The method of Seitz and Dyer is illustrated in the flow diagrams of FIG. 1a and FIG. 1b. FIG. 1a illustrates the geometric processing which is undertaken. Positions $(i, j_L)$ and $(i, j_R)$ of points in the original images $I_L$ and $I_R$ are matched by matching algorithm M to produce disparity maps $D_L$ and $D_R$. The matches are obtained by searching for similar image features so that $I_L(i, j_L)$ and $I_R(i, j_R)$ are approximately equal since they represent the same feature of the scene. Alternatively, this may be considered as a position $(i, j_L)$ in $I_L$ having a corresponding point in $I_R$ at $(i, j_R) = (i, j_L - D_L(i, j_L))$. Likewise, the point $(i, j_R)$ in $I_R$ has a corresponding point in $I_L$ at $(i, j_L) = (i, j_R + D_R(i, j_R))$. The row index i is the same in the two images since the images are assumed to be rectified, that is, common features are expected to be related by horizontal translations only.

FIG. 1b illustrates the colour processing of the image. Colours from the original images $I_L$ and $I_R$ are forward mapped into the coordinates $j_L'$ and $j_R'$ of two novel images $I_L'$ and $I_R'$. In each case, the final colour is obtained by a blending operation B. The blending operation produces a colour value in the novel images $I_L'$ and $I_R'$ for each of the corresponding image features.

FIG. 2 illustrates the positions of the cameras associated with the original images $I_L$ and $I_R$. The positions of the novel views $I_L'$ and $I_R'$ between the positions of the two original images may be defined using a parameter t whose value varies between 0 and 1 between the positions of the original images. For the synthesis of stereoscopic image pairs, two such parameters are required: $t_L$ and $t_R$ for novel views $I_L'$ and $I_R'$, respectively.

The process illustrated in FIG. 1b can be understood by following the route of a particular pixel. For example, starting from the top left box of FIG. 1b, a colour from image $I_L$ at position $j_L$ is selected. The disparity map $D_L$ is used to map this colour to two new positions. The first new position lies in image $I_L'$ at position $j_L' = j_L - t_L D_L(j_L)$. The second new position is in image $I_R'$ at position $j_R' = j_L - t_R D_L(j_L)$. Similarly, a colour from image $I_R$ at position $j_R$ is mapped to positions $j_L' = j_R + (1 - t_L) D_R(j_R)$ in $I_L'$ and to $j_R' = j_R + (1 - t_R) D_R(j_R)$ in image $I_R'$ using disparity map DR. This gives a pair of colours at each position in $I_L'$ and $I_R'$ which are blended as indicated.

U.S. Pat. No. 6,215,496 describes a modified "sprite" representation in which ordinary sprites can be used to render relatively flat or distant parts of a scene. Only one input image is used, taken in conjunction with an associated depth map. The depth information is forward mapped to the output position and the colour is reverse mapped to the single input image. This representation can be improved by allowing each pixel to be independently offset from the sprite mapping. The offsets are determined by the scene depth of the points in relation to the surface that is being warped. It is assumed that the offsets can be obtained from an existing model of the surface, or computed by a correspondence algorithm. The method of U.S. Pat. No. 6,215,496 is illustrated in FIGS. 3a and 3b which show the geometric and colour processing, respectively. The original images, $I_L$ and $I_R$ are matched as above. The disparities are then forward mapped giving new disparity maps $D_L'$ and $D_R'$ in the coordinates of the new images. Specifically, a disparity $D_L(j_L)$ is mapped to position $j_L' = j_L - t_L D_L(j_L)$ in new disparity map $D_L'$ and similarly a disparity $D_R(j_R)$ is mapped to position $j_R' = j_R + (1-t_R) D_R(j_R)$ in new disparity map $D_R'$.

The colour processing shown in FIG. 3b starts from a position in one of the novel views, using the corresponding disparity map to look up a colour in one of the source images. This colour is then rendered in the novel view. For example, position $j_L'$ in image $I_L'$ corresponds to disparity $D_L'(j_L')$. This means that $j_L'$ can be mapped to position $j_L = j_L' + t_L D_L'(j_L')$ in image $I_L$. The colour $I_L(j_L)$ can then be rendered to position $j_L'$ in image $I_L'$.

The method of Chen and Williams is designed to work with computer-generated images. The method of Seitz and Dyer uses forward mapping. The method of the above-mentioned US patent is designed to produce novel views of flat or distant parts of a scene based on a single source image. It is desired to be able to provide a method of generating novel views of a scene. Particularly, it is desired to provide a method which can be used to vary the depth range in a stereogram when no explicit three-dimensional information about the scene is available.

U.S. Pat. No. 5,917,937 discloses a stereo matching algorithm for determining disparities, colours and opacities from multiple input images. This algorithm generates a general disparity space and makes estimates of colours and opacities in the disparity space by forward mapping the source images into the disparity space. Statistical methods are used to refine the estimates.

SUMMARY

According to a first aspect of the invention, there is provided a method of processing images comprising the steps of:
(a) providing first and second images of a scene;
(b) applying a stereo matching algorithm to the first and second images to generate a first disparity map which maps between corresponding points from the first image to the second image;
(c) forward mapping the first disparity map into the coordinates of a third image to generate a second disparity map;
(d) using the second disparity map, reverse mapping for each pixel position in the third image to corresponding points in the first and second images to obtain possible colour values for each pixel in the third image; and
(e) assigning a final colour value to each of the at least some of the pixels in the third image on the basis of the possible colour values, thereby providing a novel view of the scene.

The first and second images may have been rectified so that they are related by horizontal offsets only.

The position of the third image may be chosen by a user. The position of the third image may lie between the positions of the first and second images.

Step (c) may comprise forward mapping the first disparity map such that each entry in the second disparity map identifies a unique position in each of the first and second images. Step (c) may comprise adjusting the forward mapping such that gaps in the second disparity map are filled. The gaps in the pixel positions of the third image may be filled on the basis of the values of the second disparity map at each end of each gap.

The colour values obtained from the first and second images corresponding to each pixel position in the third image in step (d) may be obtained by interpolation between neighbouring pixels in each of the first and second images. Interpolation may be one of linear and cubic approximation.

Step (e) may comprise blending the possible colour values to provide the colour value. The blending may be performed in accordance with the proximity of the location of the third image with respect to the locations of the first and second images. The colour blending may be weighted such that the closer of the first and second images to the third image has a greater influence on the colour of the pixel in the third image.

The final colour value may be one of the possible colour values.

The stereo matching algorithm of step (b) may comprise enforcing a monotonicity constraint to produce a single disparity map.

The method may comprise the further steps of repeating step (b) with the first and second images exchanged, thereby generating a different first disparity map which maps between corresponding points from the second image to the first image; and repeating step (c) for the different first disparity map to generate a different second disparity map; wherein step (d) is performed for each of the two second disparity maps to obtain the possible colour values.

The two second disparity maps may be merged in the coordinates of the third image prior to steps (d) and (e). The method may comprise the further step of comparing the two first disparity maps and deleting any inconsistent entries, thereby providing a single first disparity map.

The method may comprise the further step of repeating steps (c) to (e) for a different third image position, thereby producing two third images together forming a novel stereo pair view of the scene.

In accordance with a second aspect of the invention, there is provided an apparatus for processing images comprising: image acquisition means for providing first and second images of a scene; means for applying a stereo matching algorithm to the first and second images to generate a first disparity map which maps between corresponding points from the first image to the second image; means for forward mapping the first disparity map into the coordinates of a third image to generate a second disparity map; means for using the second disparity map to perform a reverse mapping for at least some of the pixel positions in the third image to corresponding points in the first and second images to obtain possible colour values for each of the at least some of the pixels in the third image; and means for assigning a final colour value to each of the at least some of the pixels in the third image on the basis of the possible colour values, thereby providing a novel view of the scene.

In accordance with a further aspect of the invention, there is provided a program for controlling a computer to perform the method and the first aspect of the invention.

The program may be stored in a storage medium. The program may be transmitted across a communications network.

In accordance with a still further aspect of the invention, there is provided a computer programmed to perform the method of the first aspect of the invention.

BRIEF DESCRIPTION OF THE DRAWINGS

FIGS. 7 and 8 are plan views of the scene of FIG. 2;

DETAILED DESCRIPTION

Figure 4:
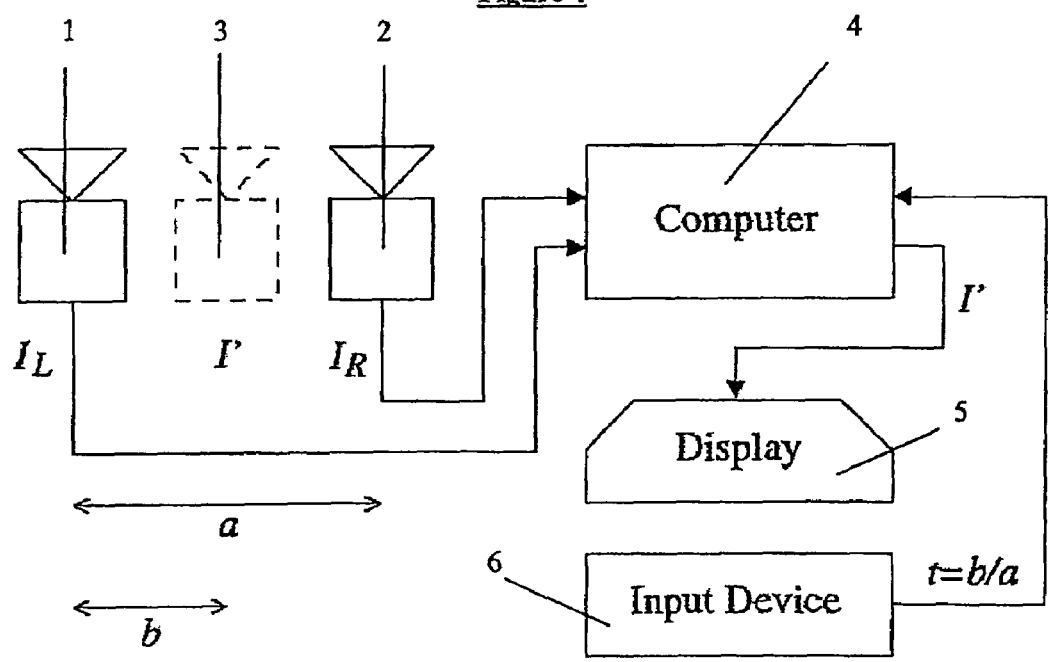
FIG. 4 illustrates an embodiment of the present invention.

The embodiments described hereinbelow define a method for synthesising new images from two given views of a scene. Partially occluded and ambiguous regions of each novel view are rendered appropriately. Additionally, colour information from both input images is used to determine the pixel values in each novel view. An embodiment of the present invention is illustrated in FIG. 4. Cameras 1 and 2 are used to obtain input images $I_L$ and $I_R$, respectively. These images are transferred to a computer 4. The user may specify an intermediate viewpoint at a position t, via the input device 6. The input device may be, for example, a keyboard or a mouse. The computer processes the inputs as described below and produces an intermediate view I'. The output image appears on a display 5 attached to the computer. The intermediate position at which the novel view is generated is equivalent to capturing an image of the scene with a notional camera 3, positioned a distance b from camera 1. The location of the novel view I' is defined in terms of the ratio of distance b to distance a, the total distance between cameras 1 and 2.

The method of the first embodiment of the present invention comprises obtaining disparity maps between more than one input image, using, for example, a matching algorithm, forward mapping disparities from more than one image to each desired output image position, and obtaining the colour information for the novel view by reverse mapping back to more than one input image. The embodiments of the invention may be used to generate a pair of novel views comprising a novel synthetic stereo pair. The embodiments of the invention are more accurate than the forward mapping algorithm described by Seitz and Dyer. The reverse mapping procedure introduces fewer anomalous pixels, and no spurious blank regions. As is well known, a reverse mapping procedure also allows source images to be sampled in a more controlled manner.

An advantage of the reverse mapping process described below is that newly hidden or revealed parts of the scene can be resolved among pixel offsets rather than among pixel colours, as is required in certain of the above prior art. This allows the novel views to be rendered more completely and more accurately.

According to certain of the embodiments, it can be ensured that the two source images are consistent with each other. This constraint reduces the number of depth artefacts that are apparent when the new images are viewed as a stereo pair. The importance of combining colour information from different source images is preserved.

Figure 1A:
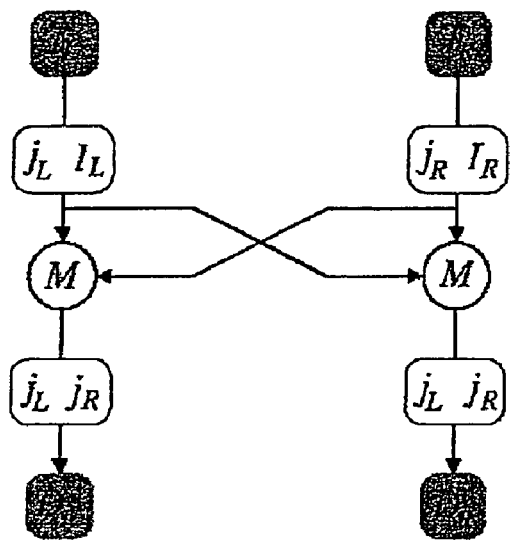
FIGS. 1a and 1b are flow diagrams illustrating a prior art method of synthesising a novel view of a scene.
Figure 1B:
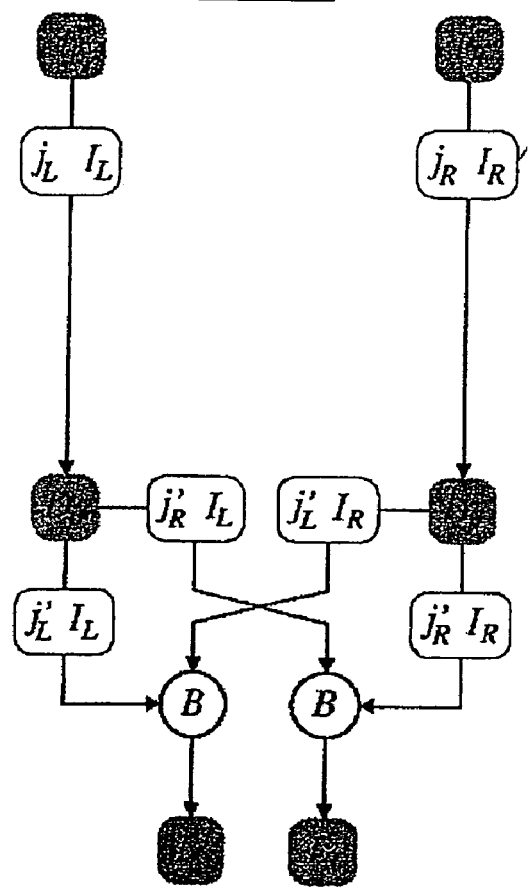
Figure 2:
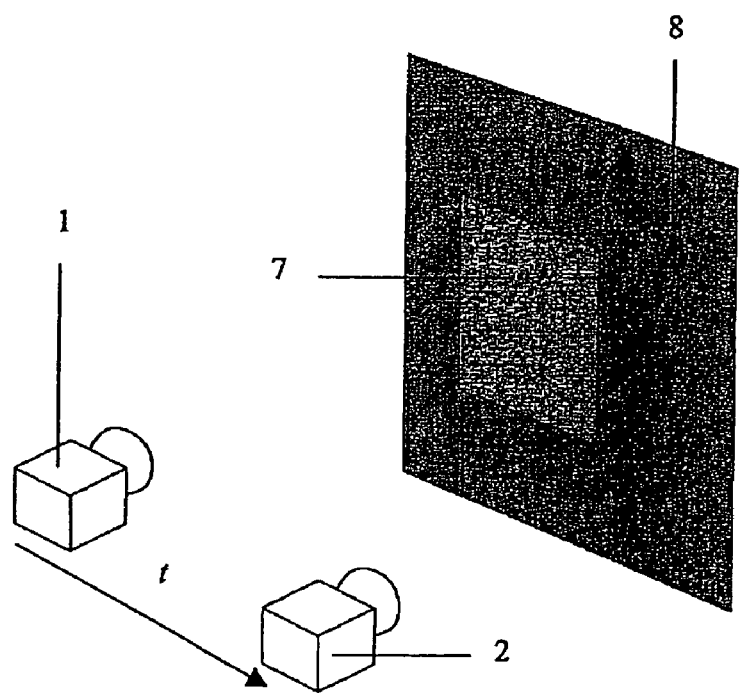
FIG. 2 illustrates two cameras obtaining two different views of a scene.
Figure 3A:
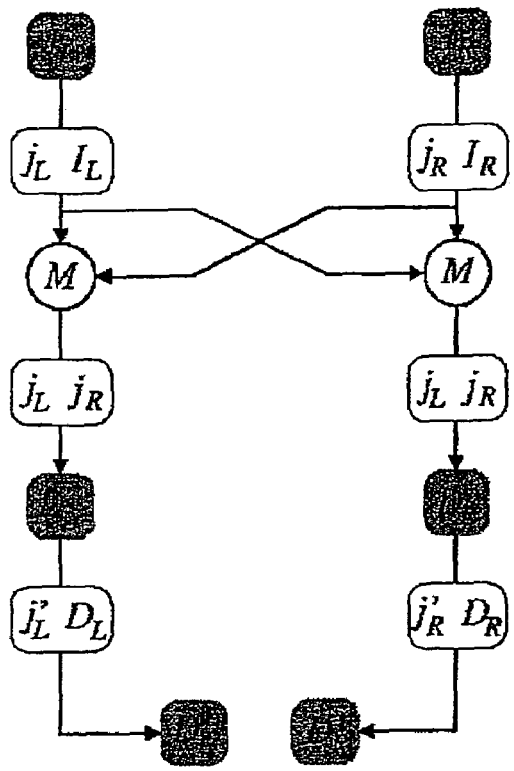
FIGS. 3a and 3b are flow diagrams illustrating a further prior art method of synthesising a novel view of a scene.
Figure 3B:
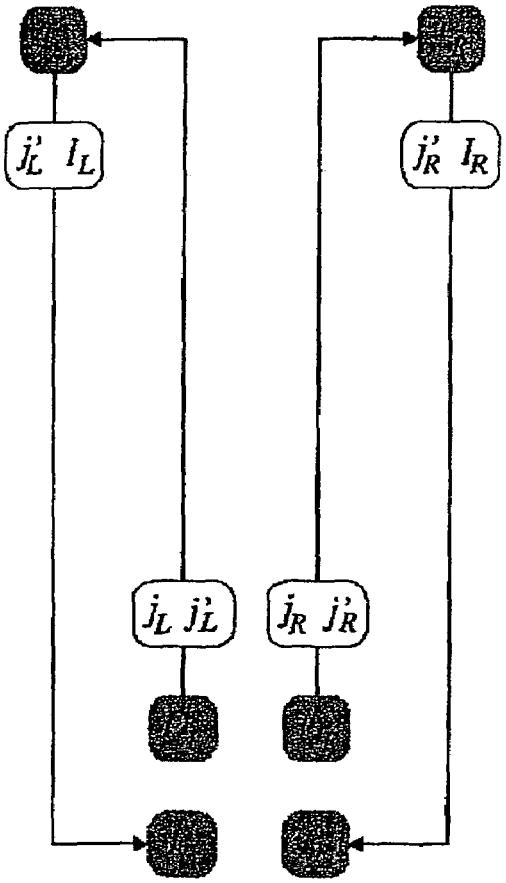

The method as described hereinbelow requires two or more input views of the same scene or object. The minimal case is illustrated in FIG. 2 in which cameras 1 and 2 capture a stereo pair of images $I_L$ and $I_R$ of a scene comprising surfaces 7 and 8 separated in depth. If the cameras are not side-by-side with parallel optic axes, the images must first be rectified. The process of rectification ensures that corresponding features in the two images are related by horizontal offsets only.

Figure 5:
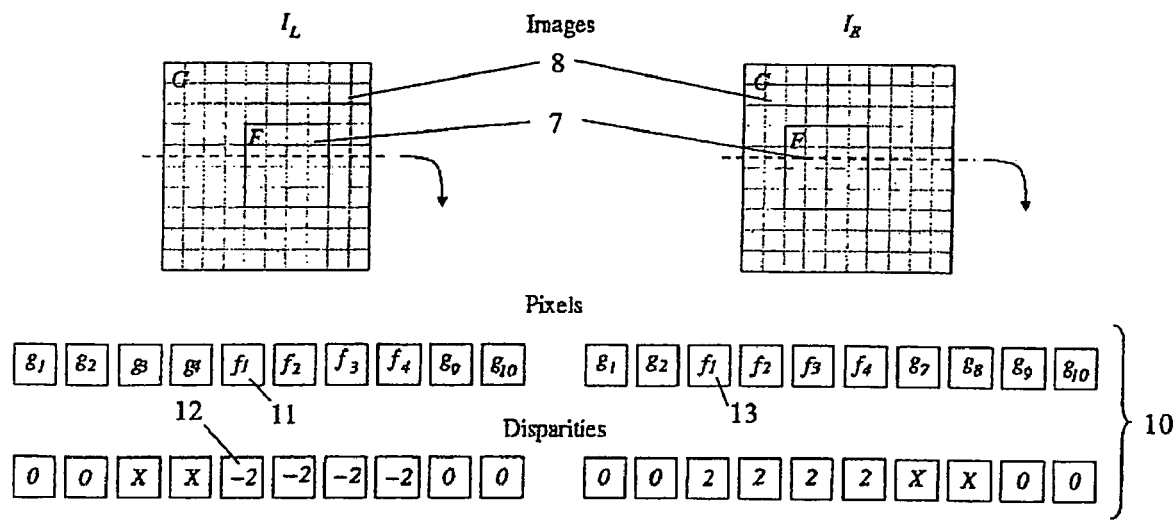
FIG. 5 illustrates the creation of a disparity map in accordance with an embodiment of the present invention.

The two images produced by the cameras of FIG. 2 are illustrated in FIG. 5. The two surfaces 7 and 8 are denoted with labels F and G. Since the two cameras capturing the two images are parallel, only horizontal disparities are present. The two images have been cropped, so that surface G has no disparity. A row of pixels through the centre of each image is denoted by the dotted line. The row of pixels and the corresponding disparities are shown at 10. For example, point $f_1$ is at pixel position 5 in image $I_L$ and at position 5+(−2)=3 in image $I_R$. That is, the pixel indicated at 11 contains image feature $f_1$ and has a corresponding entry at 12 in the disparity map of −2. This indicates that, to obtain the corresponding position of feature $f_1$ in image $I_R$, two pixel positions must be subtracted from the pixel position of $f_1$ in image $I_L$, leaving the pixel at position 3 in image $I_R$ as indicated at 13. Points labelled X were visible in one image only, and can therefore not be matched.

Figure 6A:
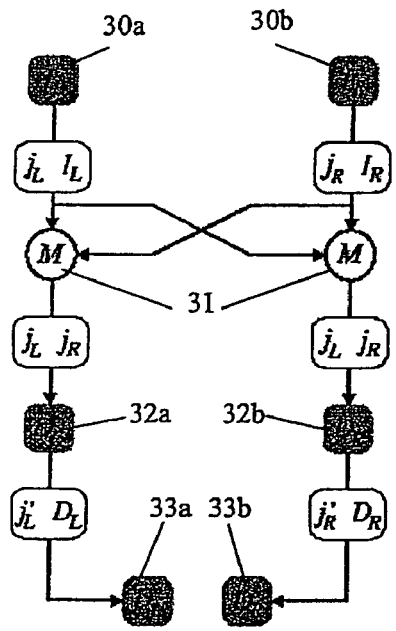
FIGS. 6a and 6b are flow diagrams illustrating a method of synthesising a novel view of a scene in accordance with an embodiment of the present invention.
Figure 6B:
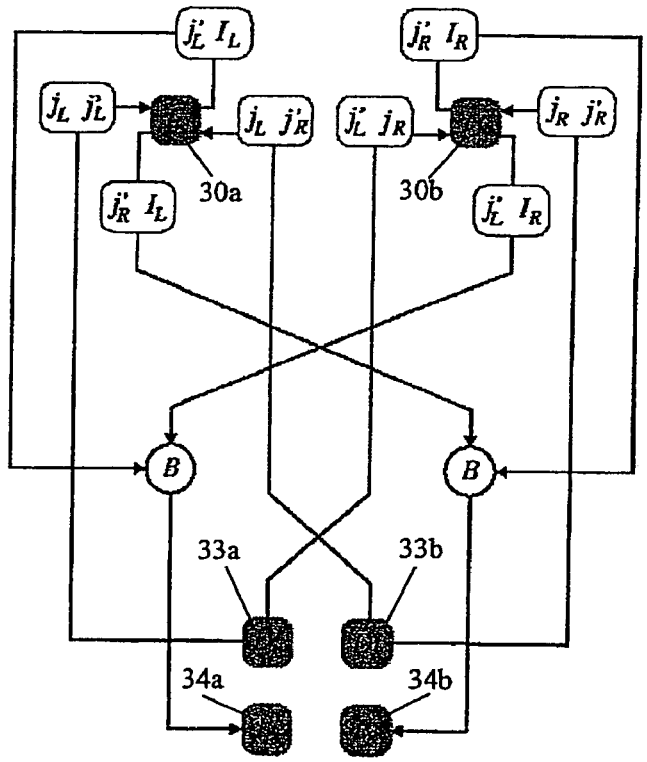

FIGS. 6a and 6b are flow diagrams illustrating the geometric processing and colour processing aspect of the embodiment of the present invention, respectively. Starting from source images $I_L$ and $I_R$ (30a, 30b), a stereo matching algorithm M (31) is used to compute the correspondence maps (or disparity maps) producing disparity maps $D_L$ (32a) (which maps image $I_L$ to image $I_R$) and $D_R$ (32b) (which maps image $I_R$ to image $I_L$). In general, the two maps are independent because there will be features in image $I_L$ that are hidden from view in image $I_R$, and vice versa. The disparity maps are computed and forward mapped to provide new disparity maps $D_L'$ and $D_R'$ (33a, 33b). Starting from a position in one of the two novel views, the corresponding disparity map is used to look up a colour in each source view. For example, disparity map $D_L$ 40 is used to look up colours at $j_L$ and $j_R$ in images $I_L$ and $I_R$, respectively. The colour from image $I_L$ is associated with position $j_L'$ and blended with the colour from image $I_R$ which is also associated with position $j_L'$. The result is assigned to position $j_L'$ in image $I_L'$. A corresponding set of steps applies to the computation of the colour at position $j_R'$ in image $I_R'$. The result is two output images $I_L'$ and $I_R'$ (34a, 34b) forming novel views of the scene of the original images.

The individual stages of the algorithm are described below. It is convenient to consider the synthesis of a single image, I', rather than the stereo pair of images $I_L'$ and $I_R'$. With reference to the following section, the left-hand novel image can be obtained by substituting the corresponding features with the L subscript, and correspondingly for the right-hand novel image with the R subscript.

FIG. 7 shows points $f_1$ to $f_4$ on surface 7 and points $g_1$ to $g_{10}$ on surface 8. The configuration of the two surfaces is viewed by cameras 1 and 2, producing images $I_L$ and $I_R$, respectively.

Figure 9:
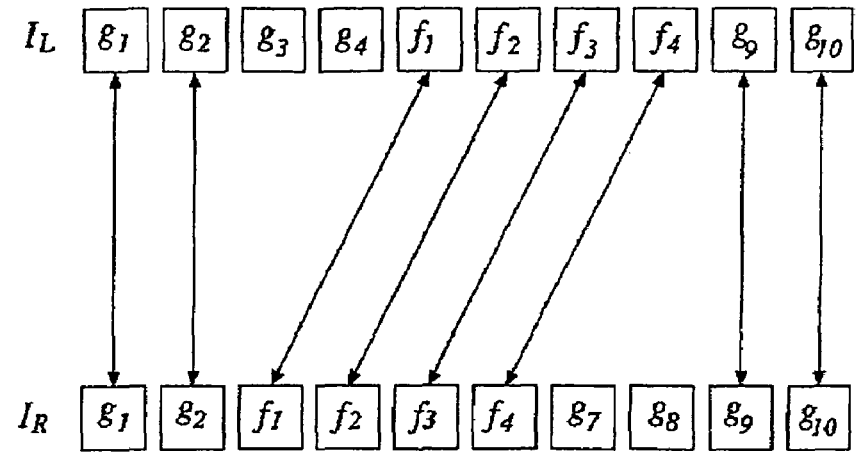
FIGS. 9-11 illustrate the steps of forward and reverse mapping in accordance with an embodiment of the present invention.

Note that $g_3$ and $g_4$ are hidden from camera 2, and that $g_7$ and $g_8$ are hidden from camera 1. Rows of pixels from images $I_L$ and $I_R$ are shown in FIG. 9, which indicates matches between image points in $I_L$ and $I_R$. Point matches are indicated by arrows, which are slanted according to the disparity. With reference to FIG. 7, it is assumed for the purposes of illustration that the images are horizontally aligned such that surface G is at zero disparity. No disparity is available at $g_3$ or $g_4$ in $I_L$, or at $g_7$ and $g_8$ in $I_R$, as these points were not visible at both cameras.

Image I' is the "target image", corresponding to a viewpoint between the original cameras. In particular, if t is a parameter in the range 0-1, and $C_L$, $C_R$ are the camera positions, then the new viewpoint is effectively located at a position $(1-t)C_L+tC_R$. For example, with $t=\frac{1}{2}$, image I' will correspond to a viewpoint halfway between $C_L$ and $C_R$, taken by notional camera 3, as shown in FIG. 8.

To perform reverse mapping, a new disparity map D', expressed in the coordinates of I' is required, as indicated in FIGS. 6a and 6b. Both $D_L$ and $D_R$ can be forward mapped into D'. If the disparities are represented by non-negative numbers, then for each position (i, j), the equations are $$D'(i,j') \leftarrow D_L(i,j_L), \text{ where } j' = j_L - tD_L(i,j_L) \text{ and}$$

$$D'(i,j') \leftarrow D_R(i,j_R), \text{ where } j' = j_R + (1-t)D_R(i,j_R) \quad (1)$$

The notation 'a←b' means 'the value b is assigned to a'. These equations can be interpreted as mapping towards $j_R$ and $j_L$ respectively, given that $0 \leq t \leq 1$.

The forward mapping process is indicated in the lower part of FIG. 6a. In general, the horizontal target coordinate in Equations (1) will not be a whole number, and so the source disparities will not map to an exact pixel position. Furthermore, it is possible for more than one source value to map to the same (approximate) position. The following procedure can be used to produce a single estimate at each pixel.

Each forward-mapped sample can be associated with a "coverage" value $0 \leq \alpha \leq 1$. For example, suppose that the horizontal target position is between two pixels p and q, so that $j_p \leq j' \leq j_q$. The source value is mapped to both positions, with $\alpha_p = j_q - j'$ and $\alpha_q = j' - j_p$. This results in a list of source values and corresponding "coverages" at each target position. The outermost values, which represent surfaces closest to the target viewpoint, should tend to occlude the other values at each position. This principle can be used to obtain a single target value at each position. The value is computed by sorting the list of candidate values from low to high disparity. The list is then composited from back to front, using the α values as weights.

The procedure described above is used to resolve multiple values into a single estimate at each position in D'. Each entry in D' identifies a unique position in each of the source images. However, in general there will also be regions of D' to which no values have been mapped. This is due to the effect of occluding surfaces in the scene. The resulting gaps can be filled independently along each row of the disparity array, as described below.

In general, the disparity surface of the occluded surface should be extended until it meets the occluding edge, and this can be achieved in the following way. The disparities at either end of each gap are examined, and the lesser of the two identifies the side that is to be extrapolated. A one-dimensional model can then be fitted to the adjacent disparities on that side of the gap. This model is constrained, such that the extrapolated edge cannot be in front of the occluding edge at the point of contact. As a convenient approximation to this procedure, the smaller of the two end-point disparities can simply be assigned to all positions in the gap. This is effectively a zero-order extrapolation model.

Figure 10:
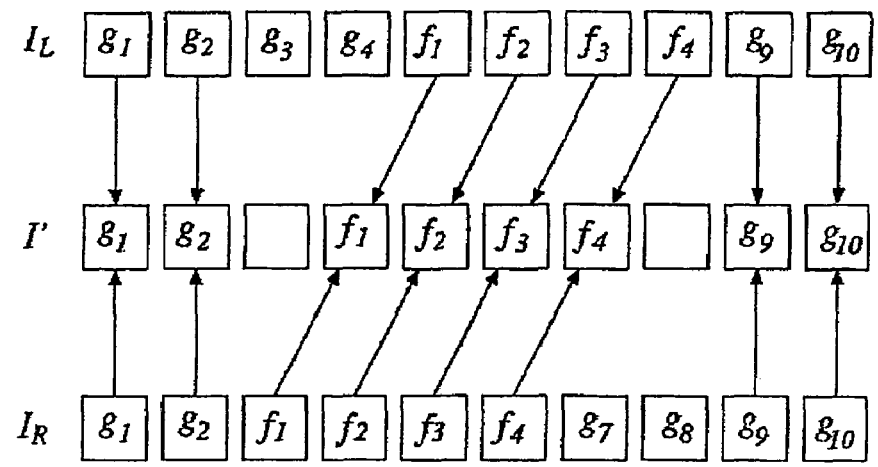
Figure 11:
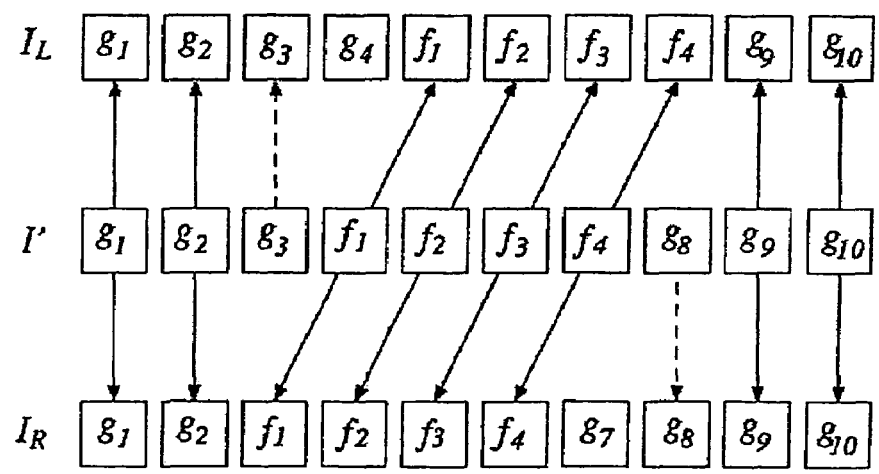

The forward mapping stage is illustrated in FIG. 10. Disparities are forward mapped according to the correspondences shown in FIG. 9. This process leaves gaps between $g_2$ and $f_1$ and between $f_4$ and $g_9$ in the coordinates of I'. The missing values are estimated by comparing the end points of the gap; in this example, the disparity of $g_2$ is less than that of $f_1$, and so its value will be copied into the gap. Similarly, the disparity of $g_9$ will be copied into the gap between $f_4$ and $g_9$ in I'. With reference to FIGS. 2 and 7, it can be seen in FIG. 11 that surface G has effectively been extended to meet the occluding surface F.

In order to render the novel view, each pixel position must now be reverse mapped into the source views as follows:

$$I'(i,j') \leftarrow \begin{cases} I_L(i, j_L) \\ I_R(i, j_R) \end{cases} \text{ where } j_L = j' + tD'(i,j') \text{ and} \quad (2)$$

$$j_R = j' - (1-t)D'(i,j').$$

Note that if t=0, then $j_L$=j', so that points can be drawn directly from $I_L$. Likewise, if t=1, then $j_R$=j', so that points can be drawn directly from $I_R$. In general, the source coordinates in $I_L$ and $I_R$ will not be integer positions. However, it is straightforward to obtain a colour in each case, by interpolation between the neighbouring pixels. Linear interpolation between the horizontally adjacent values is a suitable procedure, although more accurate models, such as cubic interpolation, could be used.

According to Equation (2), the backward mapping and interpolation procedures will usually give two possible values for each pixel in the novel view. It is natural to blend these colours, according to the proximity of the novel viewpoint to the source camera positions. In particular, if I' coincides with $I_L$, then colours from $I_R$ should make no contribution. Likewise, $I_L$ should not contribute if I' coincides with $I_R$. If the new view coincides with one of the original views, then the new colour will be set equal to the corresponding original colour. These considerations lead to the colour-blending scheme $$I'(i,j') \leftarrow (1-t)I_L(i,j_L) + tI_R(i,j_R) \quad (3)$$

with $j_L$ and $j_R$ defined as in Equation (2). Points that were visible in one view only (such as $g_3$ in FIG. 11) must be rendered directly, as there is no companion colour to blend with. For this reason, it may be desirable to apply a global colour normalisation to the two original images before the pixels are mapped.

The process described above will produce a geometrically correct interpolated view, subject to the accuracy of the disparity information and the extrapolation model. For example, the scene shown in FIG. 7 will be rendered correctly by the method described here. This is not true of the ordinary forward mapping method, for example, assuming that the pixel colours were forward mapped. With reference to FIG. 10, consider the pixel between $g_2$ and $f_1$ which, as before, is left undefined in the coordinates of I'. The gap could be filled by interpolating between the known colours $g_2$ and $f_1$, as shown by Chen and Williams and by Seitz and Dyer. This approach would not, in general, give an accurate estimate of the missing value; in particular, surfaces F and G are separate, as in FIG. 7, and so they are likely to be distinct colours. If the gap around $g_3$ is large, then a spurious colour gradient will appear in the synthetic range. Note that extrapolation of the colour from either end of the gap will, in general, also produce an artefact. This is because the missing image region may contain complex image features. It is not usually possible to extrapolate (or interpolate) image features from the surrounding pixels. In principle, the gaps in the original disparity arrays could be filled before the forward mapping process. However, this would still not guarantee that all pixels in I' would be defined, and so the gap-filling problem would remain.

In some cases, previously unseen image texture must be synthesised in the novel view. When combined with a texture-synthesis algorithm, the procedure described above ensures that new images from different viewpoints will be mutually consistent.

As described above, the method described herein is particularly well suited to the synthesis of stereoscopic image pairs. This is because two interpolated images of the same scene will be mutually consistent. In a further embodiment, the method can also be used to synthesise individual images, for non-stereoscopic applications.

The disparity maps $D_L$ and $D_R$ may have been obtained independently, by matching the left image to the right, and the right image to the left, respectively. In general, the two disparity maps will not be mutually consistent, due to errors in the matching process. However, it is possible to enforce consistency in the following way: $D_L$ is used to map a point $(i, j_L)$ in $I_L$ to $(i, j_R)$ in $I_R$. The other disparity map, DR, is then used to map $(i, j_R)$ back to $I_L$. If the disparity maps are consistent, then the above process will return the original point, $(i, j_L)$. If the test fails, then the disparity $DL(i, j_L)$ can be discarded. The same result would be obtained with the L and R indices exchanged.

If the disparity maps are consistent, then it is unnecessary to store both of them, because $D_L$ can be computed from $D_R$, and vice versa. Monotonicity is a special case of consistency, meaning that corresponding features appear in the same horizontal order in $I_L$ and $I_R$. It is often useful to enforce monotonicity, as part of the image-matching algorithm. This results in a single disparity map. Furthermore, the process of forward mapping the disparities (as in Equation (1)) is simplified in this case. The ordering constraint means that no more than one disparity can map to a given position in D', and so there are no conflicts to be resolved.

Depending on the choice of matching algorithm, the disparity map can be incomplete. For example, the matching algorithm may fail over blank regions of the source images, in which there are no features to be matched. Equally, it may be desirable to delete any disparities in $D_L$ that are inconsistent with DR, and vice versa, as described above. The resulting gaps can be filled as described above.

If there are more than two source views, it may be possible to compute several independent disparity maps. This is because the visible regions of the scene are likely to vary according to the choice of camera pair. There are two ways to combine the multiple estimates. As described earlier in the case of two disparity maps, the largest available value (meaning the closest feature) can always be chosen. Alternatively, a consistent relationship can be imposed among all of the disparity maps, as described above.

In order to increase the depth range, new views must be obtained from more widely separated positions. This makes it much more likely that part of a novel view will have been hidden from both source cameras. Although it will not usually be possible to render the hidden area correctly, it may be possible to make a good prediction. Furthermore, the prediction can be made consistently across a number of synthetic views.

The appearance of an unseen area can often be well predicted from the appearance of the surrounding region. For example, Effros and Leung, Texture Synthesis by Non-Parametric Sampling, Proc, IEEE International Conference on Computer Vision, 1999, pages 1033-1038, describes a simple algorithm which is capable of synthesising a variety of image textures. New pixel colours are predicted by a procedure which involves sampling the horizontal and vertical image neighbourhood. If a completely new image region must be generated in each of two novel views, a texture synthesis algorithm could be applied to the missing region in each case. However, this would not result in a consistent stereo image pair.

The reverse mapping representation, described above, allows for consistent texture synthesis. This is because it is possible to sample the source images via the backward mapping procedure. The resulting texture model then supplies the missing pixel values. Since the same texture model is used for each new image, the resulting novel views will be mutually consistent.

Figure 12:
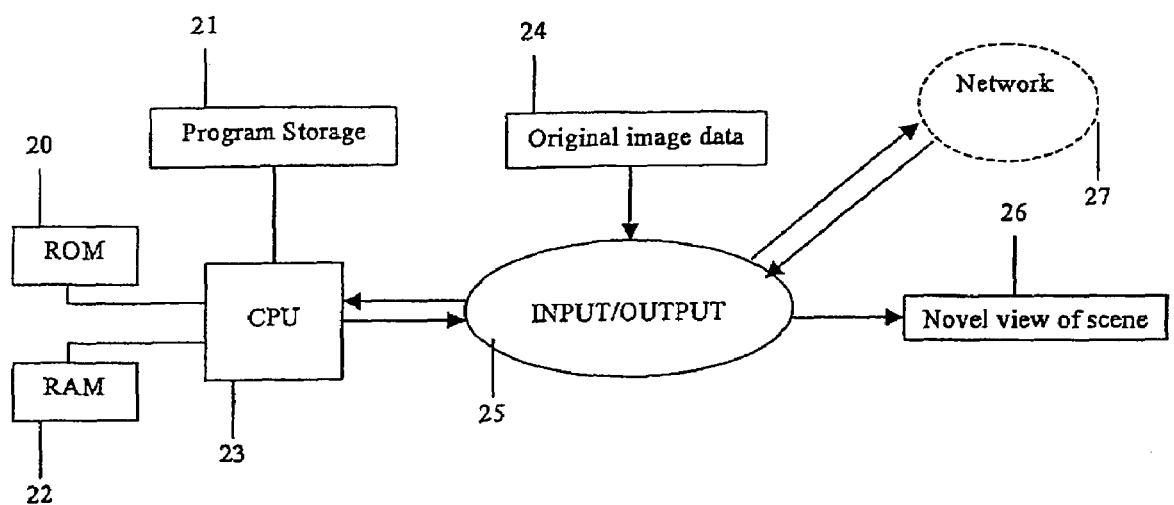
FIG. 12 is a schematic diagram of a computer in accordance with an embodiment of the present invention.

The schematic diagram of FIG. 12 illustrates a computer 4 for performing the above-described image processing. A central processing unit (CPU) 23 is connected to a read-only memory (ROM) 20 and a random access memory (RAM) 22. The CPU is provided with image data 24 from the image sources via an input/output mechanism 25. The CPU then performs the geometric and colour processing to provide the novel image 26, in accordance with instructions provided by the program storage 21 (which may be part of the ROM 20). The program itself, or any of the inputs and/or outputs to the system may be provided or transmitted to/from a communication network 27, which may be, for example, the internet.

It will be appreciated by the skilled person that various modifications may be made to the above embodiments without departing from the scope of the present invention as set out in the accompanying claims.

What is claimed is:

1. A method of processing images, said method comprising the steps of:
   (a) providing first and second images of a scene;
   (b) applying a stereo matching algorithm to said first and second images to generate a first disparity map which maps between corresponding points from said first image to said second image;
   (c) forward mapping said first disparity map into coordinates of a third image to generate a second disparity map;
   (d) using said second disparity map, reverse mapping for at least some of pixel positions in said third image to corresponding points in said first and second images to obtain possible colour values for each of at least some of pixels in said third image; and
   (e) assigning a final colour value to each of said at least some of said pixels in said third image on a basis of said possible colour values, thereby providing a novel view of said scene.

2. A method as claimed in claim 1, wherein said first and second images have been rectified so that they are related by horizontal offsets only.

3. A method as claimed in claim 1, wherein a position of said third image is chosen by a user.

4. A method as claimed in claim 1, wherein a position of said third image lies between positions of said first and second images.

5. A method as claimed in claim 1, wherein said step (c) comprises forward mapping said first disparity map such that each entry in said second disparity map identifies a unique position in each of said first and second images.

6. A method as claimed in claim 5, wherein said step (c) comprises adjusting said forward mapping such that gaps in said second disparity map are filled.

7. A method as claimed in claim 6, wherein said gaps in said second disparity map are filled on a basis of values of said second disparity map at each end of each gap.

8. A method as claimed in claim 1, wherein said colour values obtained from said first and second images corresponding to each pixel position in said third image in said step (d) are obtained by interpolation between neighbouring pixels in each of said first and second images.

9. A method as claimed in claim 8, wherein said interpolation is one of: linear and cubic approximation.

10. A method as claimed in claim 1, wherein said step (e) comprises blending said possible colour values to provide said final colour value.

11. A method as claimed in claim 10, wherein said blending is in accordance with a proximity of a location of said third image with respect to locations of said first and second images.

12. A method as claimed in claim 11, wherein said colour blending is weighted such that a closer of said first and second images to said third image has a greater influence on a colour of a pixel in said third image.

13. A method as claimed in claim 1, wherein said final colour value is one of said possible colour values.

14. A method as claimed in claim 1, wherein said stereo matching algorithm of said step (b) comprises enforcing a monotonicity constraint to produce a single disparity map.

15. A method as claimed in claim 1, comprising the further steps of: repeating said step (b) with said first and second images exchanged, thereby generating a different first disparity map which maps between corresponding points from said second image to said first image; and repeating said step (c) for said different first disparity map to generate a different second disparity map; wherein said step (d) is performed for each of said two second disparity maps to obtain said possible colour values.

16. A method as claimed in claim 15, wherein said two second disparity maps are merged in coordinates of said third image prior to said steps (d) and (e).

17. A method as claimed in claim 16, comprising the further steps of comparing said two first disparity maps and deleting any inconsistent entries, thereby providing a single first disparity map.

18. A method as claimed in claim 1, comprising the further step of repeating said steps (c) to (e) for a different third image position, thereby producing two third images together forming a novel stereo pair view of said scene.

19. An apparatus for processing images, comprising:
    image acquisition means for providing first and second images of a scene;
    means for applying a stereo matching algorithm to said first and second images to generate a first disparity map which maps between corresponding points from said first image to said second image;
    means for forward mapping said first disparity map into coordinates of a third image to generate a second disparity map;
    means for using said second disparity map to perform a reverse mapping for at least some pixel positions in said third image to corresponding points in said first and second images to obtain possible colour values for each of at least some pixels in said third image; and
    means for assigning a final colour value to each of said at least some pixels in said third image on a basis of said possible colour values, thereby providing a novel view of said scene.

20. A program embodied in a computer-readable medium for controlling a computer to perform a method of processing images, said method comprising the steps of:
    (a) providing first and second images of a scene;
    (b) applying a stereo matching algorithm to said first and second images to generate a first disparity map which maps between corresponding points from said first image to said second image;
    (c) forward mapping said first disparity map into coordinates of a third image to generate a second disparity map;
    (d) using said second disparity map, reverse mapping for at least some of pixel positions in said third image to corresponding points in said first and second images to obtain possible colour values for each of at least some of pixels in said third image; and
    assigning a final colour value to each of said at least some of said pixels in said third image on a basis of said possible colour values, thereby providing a novel view of the said scene.

21. The method according to claim 1, further comprising providing, via a communication network, at least one of i) at least input data utilized by steps (a)-(e), ii) at least output data generated by steps (a)-(e), or iii) at least instructions for carrying out steps (a)-(e).

22. A computer programmed to perform a method of processing images, said method comprising the steps of:
    (a) providing first and second images of a scene;
    (b) applying a stereo matching algorithm to said first and second images to generate a first disparity map which maps between corresponding points from said first image to said second image;
    (c) forward mapping said first disparity map into coordinates of a third image to generate a second disparity map;
    (d) using said second disparity map, reverse mapping for at least some of pixel positions in said third image to corresponding points in said first and second images to obtain possible colour values for each of at least some of pixels in said third image; and
    assigning a final colour value to each of said at least some of said pixels in said third image on a basis of said possible colour values, thereby providing a novel view of said scene.

* * * * *